US008577483B2

(12) United States Patent
Oh et al.

(10) Patent No.: US 8,577,483 B2
(45) Date of Patent: Nov. 5, 2013

(54) METHOD FOR DECODING AN AUDIO SIGNAL

(75) Inventors: Hyen O Oh, Gyeonggi-do (KR); Hee Suk Pang, Seoul (KR); Dong Soo Kim, Seoul (KR); Jae Hyun Lim, Seoul (KR); Yang-Won Jung, Seoul (KR)

(73) Assignee: LG Electronics, Inc., Seoul (KR)

( * ) Notice: Subject to any disclaimer, the term of this patent is extended or adjusted under 35 U.S.C. 154(b) by 1364 days.

(21) Appl. No.: 12/065,267

(22) PCT Filed: Aug. 30, 2006

(86) PCT No.: PCT/KR2006/003434
§ 371 (c)(1),
(2), (4) Date: Feb. 28, 2008

(87) PCT Pub. No.: WO2007/027055
PCT Pub. Date: Mar. 8, 2007

(65) Prior Publication Data

US 2008/0235035 A1 Sep. 25, 2008

Related U.S. Application Data

(60) Provisional application No. 60/712,119, filed on Aug. 30, 2005, provisional application No. 60/719,202, filed on Sep. 22, 2005, provisional application No. 60/723,007, filed on Oct. 4, 2005, provisional application No. 60/726,228, filed on Oct. 14, 2005, provisional application No. 60/729,225, filed on Oct. 24, 2005, provisional application No. 60/735,628, filed on Nov. 12, 2005, provisional application No. 60/748,607, filed on Dec. 9, 2005, provisional application No. 60/762,536, filed on Jan. 27, 2006, provisional application No. 60/803,825, filed on Jun. 2, 2006.

(30) Foreign Application Priority Data

Jan. 13, 2006 (KR) ........................ 10-2006-0004055
Jan. 13, 2006 (KR) ........................ 10-2006-0004056
Jan. 13, 2006 (KR) ........................ 10-2006-0004065
Jun. 22, 2006 (KR) ........................ 10-2006-0056480

(51) Int. Cl.
*G06F 17/00* (2006.01)

(52) U.S. Cl.
USPC ........................................................ 700/94

(58) Field of Classification Search
USPC .............................. 700/94; 369/4; 381/119
See application file for complete search history.

(56) References Cited

U.S. PATENT DOCUMENTS 4,621,862 A 11/1986 Kramer
4,661,862 A 4/1987 Thompson (Continued)

FOREIGN PATENT DOCUMENTS

CA 2579114 A1 3/2006
CN 1655651 8/2005

(Continued)

OTHER PUBLICATIONS

Office Action, Australian Appln. No. 2006285544, dated Nov. 26, 2010, 2 pages.

(Continued)

*Primary Examiner* — Andrew C Flanders
(74) *Attorney, Agent, or Firm* — Fish & Richardson P.C.

(57) ABSTRACT

The invention relates to a method for decoding an audio signal, to allow an audio signal to be compressed and transferred more efficiently. The inventive method comprises steps of receiving an audio signal with spatial information signal, obtaining location information using the number of time slot and parameter of audio signal, establishing a multi-channel audio signal by applying spatial information signal to downmix signal, and performing a multi-channel array for a multi-channel audio signal in response to the output channel.

12 Claims, 8 Drawing Sheets

(56) References Cited

U.S. PATENT DOCUMENTS

| | | | |
|---|---|---|---|
| 4,725,885 | A | 2/1988 | Gonzales et al. |
| 4,907,081 | A | 3/1990 | Okamura et al. |
| 5,243,686 | A | 9/1993 | Tokuda et al. |
| 5,481,643 | A | 1/1996 | Ten Kate et al. |
| 5,515,296 | A | 5/1996 | Agarwal |
| 5,528,628 | A | 6/1996 | Park et al. |
| 5,530,750 | A | 6/1996 | Akagiri |
| 5,563,661 | A | 10/1996 | Takahashi et al. |
| 5,579,430 | A | 11/1996 | Grill et al. |
| 5,606,618 | A | 2/1997 | Lokhoff et al. |
| 5,621,856 | A | 4/1997 | Akagiri |
| 5,640,159 | A | 6/1997 | Furlan et al. |
| 5,682,461 | A | 10/1997 | Silzle et al. |
| 5,687,157 | A | 11/1997 | Imai et al. |
| 5,890,125 | A | 3/1999 | Davis et al. |
| 5,912,636 | A | 6/1999 | Gormish et al. |
| 5,945,930 | A | 8/1999 | Kajiwara |
| 5,966,688 | A | 10/1999 | Nandkumar et al. |
| 5,974,380 | A | 10/1999 | Smyth et al. |
| 6,021,386 | A | 2/2000 | Davis et al. |
| 6,125,398 | A | 9/2000 | Mirashrafi et al. |
| 6,134,518 | A | 10/2000 | Cohen et al. |
| 6,148,283 | A | 11/2000 | Das |
| 6,208,276 | B1 | 3/2001 | Snyder |
| 6,295,319 | B1 | 9/2001 | Sueyoshi et al. |
| 6,309,424 | B1 | 10/2001 | Fallon |
| 6,331,829 | B2 * | 12/2001 | Kawai ............................ 341/94 |
| 6,339,760 | B1 | 1/2002 | Koda et al. |
| 6,384,759 | B2 | 5/2002 | Snyder |
| 6,399,760 | B1 | 6/2002 | Gimeno et al. |
| 6,421,467 | B1 | 7/2002 | Mitra |
| 6,442,110 | B1 | 8/2002 | Yamamoto et al. |
| 6,453,120 | B1 | 9/2002 | Takahashi et al. |
| 6,456,966 | B1 | 9/2002 | Iwabuchi |
| 6,556,685 | B1 | 4/2003 | Urry et al. |
| 6,560,404 | B1 | 5/2003 | Okada et al. |
| 6,611,212 | B1 | 8/2003 | Craven et al. |
| 6,631,352 | B1 | 10/2003 | Fujita et al. |
| 6,636,830 | B1 | 10/2003 | Princen et al. |
| 7,376,555 | B2 | 5/2008 | Schuijers et al. |
| 7,394,903 | B2 | 7/2008 | Herre et al. |
| 7,519,538 | B2 | 4/2009 | Villemoes et al. |
| 8,005,557 | B2 * | 8/2011 | Tanaka et al. .................. 700/94 |
| 2001/0055302 | A1 | 12/2001 | Taylor et al. |
| 2002/0049586 | A1 | 4/2002 | Nishio et al. |
| 2002/0106019 | A1 | 8/2002 | Chaddha et al. |
| 2003/0009325 | A1 | 1/2003 | Kirchherr et al. |
| 2003/0016876 | A1 | 1/2003 | Chai et al. |
| 2003/0118158 | A1 * | 6/2003 | Hattori ............................ 379/68 |
| 2003/0138157 | A1 | 7/2003 | Schwartz |
| 2003/0195742 | A1 | 10/2003 | Tsushima |
| 2003/0236583 | A1 | 12/2003 | Baumgarte et al. |
| 2004/0049379 | A1 | 3/2004 | Thumpudi et al. |
| 2004/0057523 | A1 | 3/2004 | Koto et al. |
| 2004/0138895 | A1 | 7/2004 | Lokhoff et al. |
| 2004/0186735 | A1 | 9/2004 | Ferris et al. |
| 2004/0199276 | A1 | 10/2004 | Poon |
| 2004/0247035 | A1 | 12/2004 | Schroder et al. |
| 2005/0058304 | A1 | 3/2005 | Baumgarte et al. |
| 2005/0074127 | A1 | 4/2005 | Herre et al. |
| 2005/0074135 | A1 | 4/2005 | Kushibe |
| 2005/0091051 | A1 | 4/2005 | Moriya et al. |
| 2005/0114126 | A1 | 5/2005 | Geiger et al. |
| 2005/0137729 | A1 | 6/2005 | Sakurai et al. |
| 2005/0157883 | A1 | 7/2005 | Herre et al. |
| 2005/0174269 | A1 | 8/2005 | Sherigar et al. |
| 2005/0216262 | A1 | 9/2005 | Fejzo |
| 2006/0023577 | A1 | 2/2006 | Shinoda et al. |
| 2006/0085200 | A1 | 4/2006 | Allamanche et al. |
| 2006/0111800 | A1 * | 5/2006 | Wilson et al. .................. 700/94 |
| 2006/0133618 | A1 | 6/2006 | Villemoes et al. |
| 2006/0190247 | A1 | 8/2006 | Lindblom |
| 2006/0239473 | A1 | 10/2006 | Kjorling et al. |
| 2007/0038439 | A1 | 2/2007 | Schiujers et al. |
| 2007/0150267 | A1 | 6/2007 | Honma et al. |
| 2007/0206690 | A1 | 9/2007 | Sperschneider et al. |
| 2007/0223749 | A1 | 9/2007 | Kim et al. |
| 2007/0236858 | A1 | 10/2007 | Disch et al. |
| 2009/0185751 | A1 | 7/2009 | Kudo et al. |

FOREIGN PATENT DOCUMENTS

| | | |
|---|---|---|
| DE | 69712383 | 1/2003 |
| EP | 372601 | 6/1990 |
| EP | 599825 | 6/1994 |
| EP | 0610975 | 8/1994 |
| EP | 827312 | 3/1998 |
| EP | 0943143 | 4/1999 |
| EP | 948141 | 10/1999 |
| EP | 957639 | 11/1999 |
| EP | 1001549 | 5/2000 |
| EP | 1047198 | 10/2000 |
| EP | 1376538 | 1/2004 |
| EP | 1396843 | 3/2004 |
| EP | 1869774 | 10/2006 |
| EP | 1905005 | 1/2007 |
| GB | 2238445 | 5/1991 |
| GB | 2340351 | 2/2002 |
| JP | 60-096079 | 5/1985 |
| JP | 62-094090 | 4/1987 |
| JP | 09-275544 | 10/1997 |
| JP | 11-205153 | 7/1999 |
| JP | 11-225390 | 8/1999 |
| JP | 2000-036795 | 2/2000 |
| JP | 2000-090582 | 3/2000 |
| JP | 2001-169399 | 6/2001 |
| JP | 2001-188578 | 7/2001 |
| JP | 2002-042423 | 2/2002 |
| JP | 2002-191099 | 7/2002 |
| JP | 2002-520760 | 7/2002 |
| JP | 2001-53617 | 9/2002 |
| JP | 2002-328699 | 11/2002 |
| JP | 2002-335230 | 11/2002 |
| JP | 2003-005797 | 1/2003 |
| JP | 2003-015692 | 1/2003 |
| JP | 2003-187531 | 7/2003 |
| JP | 2003-233395 | 8/2003 |
| JP | 2003-533154 | 11/2003 |
| JP | 2004-170610 | 6/2004 |
| JP | 2004-220743 | 8/2004 |
| JP | 2004-234014 | 8/2004 |
| JP | 2004-264811 | 9/2004 |
| JP | 2005-063655 | 3/2005 |
| JP | 2005-202248 | 7/2005 |
| JP | 2005-332449 | 12/2005 |
| JP | 2006-120247 | 5/2006 |
| KR | 1997-0014387 | 3/1997 |
| KR | 10-1998-0011111 | 4/1998 |
| KR | 10-2000-0016543 | 3/2000 |
| KR | 2001-0001991 | 5/2001 |
| KR | 2003-0043620 | 6/2003 |
| KR | 2003-0043622 | 6/2003 |
| RU | 2158970 | 11/2000 |
| RU | 2214048 | 10/2003 |
| RU | 2221329 | 1/2004 |
| RU | 2005103637 | 7/2005 |
| TW | 204406 | 4/1993 |
| TW | 289885 | 11/1996 |
| TW | 317064 | 10/1997 |
| TW | 360860 | 6/1999 |
| TW | 378478 | 1/2000 |
| TW | 384618 | 3/2000 |
| TW | 405328 | 9/2000 |
| TW | 550541 | 9/2003 |
| TW | 567466 | 12/2003 |
| TW | 569550 | 1/2004 |
| TW | 200404222 | 3/2004 |
| TW | 1230530 | 4/2004 |
| TW | 200405673 | 4/2004 |
| TW | M257575 | 2/2005 |
| WO | WO 95/27337 | 10/1995 |
| WO | 97/40630 | 10/1997 |
| WO | 99/52326 | 10/1999 |
| WO | WO 99/56470 | 11/1999 |

(56) References Cited

FOREIGN PATENT DOCUMENTS

| | | |
|---|---|---|
| WO | 00/02357 | 1/2000 |
| WO | 00/60746 | 10/2000 |
| WO | WO 00/79520 | 12/2000 |
| WO | 03/042980 | 5/2003 |
| WO | WO 03/046889 | 6/2003 |
| WO | 03/090028 | 10/2003 |
| WO | 03/090206 | 10/2003 |
| WO | 03/090207 | 10/2003 |
| WO | WO 03088212 | 10/2003 |
| WO | 2004/008806 | 1/2004 |
| WO | 2004/028142 | 4/2004 |
| WO | WO2004072956 | 8/2004 |
| WO | 2004/080125 | 9/2004 |
| WO | WO 2004/093495 | 10/2004 |
| WO | 2005/036925 | 4/2005 |
| WO | WO 2005/043511 | 5/2005 |
| WO | 2005/059899 | 6/2005 |
| WO | 2005/069274 | 7/2005 |
| WO | WO 2006/048226 | 5/2006 |
| WO | WO 2006/108464 | 10/2006 |

OTHER PUBLICATIONS

Bessette B, et al.: Universal Speech/Audio Coding Using Hybrid ACELP/TCX Techniques, 2005, 4 pages.
Boltze Th. et al.; "Audio services and applications." In: Digital Audio Broadcasting. Edited by Hoeg, W. and Lauferback, Th. ISBN 0-470-85013-2. John Wiley & Sons Ltd., 2003. pp. 75-83.
Breebaart, J., AES Convention Paper 'MPEG Spatial audio coding/MPEG surround: Overview and Current Status', 119th Convention, Oct. 7-10, 2005, New York, New York, 17 pages.
Chou, J. et al.: Audio Data Hiding with Application to Surround Sound, 2003, 4 pages.
Faller C., et al.: Binaural Cue Coding—Part II: Schemes and Applications, 2003, 12 pages, IEEE Transactions on Speech and Audio Processing, vol. 11, No. 6.
Faller C.: Parametric Coding of Spatial Audio. Doctoral thesis No. 3062, 2004, 6 pages.
Faller, C: "Coding of Spatial Audio Compatible with Different Playback Formats", Audio Engineering Society Convention Paper, 2004, 12 pages, San Francisco, CA.
Hamdy K.N., et al.: Low Bit Rate High Quality Audio Coding with Combined Harmonic and Wavelet Representations, 1996, 4 pages.
Heping, D.,: Wideband Audio Over Narrowband Low-Resolution Media, 2004, 4 pages.
Herre, J. et al.: MP3 Surround: Efficient and Compatible Coding of Multi-channel Audio, 2004, 14 pages.
Herre, J. et al: The Reference Model Architecture for MPEG Spatial Audio Coding, 2005, 13 pages, Audio Engineering Society Convention Paper.
Hosoi S., et al.: Audio Coding Using the Best Level Wavelet Packet Transform and Auditory Masking, 1998, 4 pages.
International Search Report corresponding to International Application No. PCT/KR2006/002018 dated Oct. 16, 2006, 1 page.
International Search Report corresponding to International Application No. PCT/KR2006/002019 dated Oct. 16, 2006, 1 page.
International Search Report corresponding to International Application No. PCT/KR2006/002020 dated Oct. 16, 2006, 2 pages.
International Search Report corresponding to International Application No. PCT/KR2006/002021 dated Oct. 16, 2006, 1 page.
International Search Report corresponding to International Application No. PCT/KR2006/002575, dated Jan. 12, 2007, 2 pages.
International Search Report corresponding to International Application No. PCT/KR2006/002578, dated Jan. 12, 2007, 2 pages.
International Search Report corresponding to International Application No. PCT/KR2006/002579, dated Nov. 24, 2006, 1 page.
International Search Report corresponding to International Application No. PCT/KR2006/002581, dated Nov. 24, 2006, 2 pages.
International Search Report corresponding to International Application No. PCT/KR2006/002583, dated Nov. 24, 2006, 2 pages.
International Search Report corresponding to International Application No. PCT/KR2006/003420, dated Jan. 18, 2007, 2 pages.
International Search Report corresponding to International Application No. PCT/KR2006/003424, dated Jan. 31, 2007, 2 pages.
International Search Report corresponding to International Application No. PCT/KR2006/003426, dated Jan. 18, 2007, 2 pages.
International Search Report corresponding to International Application No. PCT/KR2006/003435, dated Dec. 13, 2006, 1 page.
International Search Report corresponding to International Application No. PCT/KR2006/003975, dated Mar. 13, 2007, 2 pages.
International Search Report corresponding to International Application No. PCT/KR2006/004014, dated Jan. 24, 2007, 1 page.
International Search Report corresponding to International Application No. PCT/KR2006/004017, dated Jan. 24, 2007, 1 page.
International Search Report corresponding to International Application No. PCT/KR2006/004020, dated Jan. 24, 2007, 1 page.
International Search Report corresponding to International Application No. PCT/KR2006/004024, dated Jan. 29, 2007, 1 page.
International Search Report corresponding to International Application No. PCT/KR2006/004025, dated Jan. 29, 2007, 1 page.
International Search Report corresponding to International Application No. PCT/KR2006/004027, dated Jan. 29, 2007, 1 page.
International Search Report corresponding to International Application No. PCT/KR2006/004032, dated Jan. 24, 2007, 1 page.
International Search Report in corresponding International Application No. PCT/KR2006/004023, dated Jan. 23, 2007, 1 page.
ISO/IEC 13818-2, Generic Coding of Moving Pictures and Associated Audio, Nov. 1993, Seoul, Korea.
ISO/IEC 14496-3 Information Technology—Coding of Audio-Visual Objects—Part 3: Audio, Second Edition (ISO/IEC), 2001.
Jibra A., et al.: Multi-layer Scalable LPC Audio Format; ISACS 2000, 4 pages, IEEE International Symposium on Circuits and Systems.
Jin C, et al.: Individualization in Spatial-Audio Coding, 2003, 4 pages, IEEE Workshop on Applications of Signal Processing to Audio and Acoustics.
Kostantinides K: An introduction to Super Audio CD and DVD-Audio, 2003, 12 pages, IEEE Signal Processing Magazine.
Liebchem, T.; Reznik, Y.A.: MPEG-4: an Emerging Standard for Lossless Audio Coding, 2004, 10 pages, Proceedings of the Data Compression Conference.
Ming, L.: A novel random access approach for MPEG-1 multicast applications, 2001, 5 pages.
Moon, Han-gil, et al.: A Multi-Channel Audio Compression Method with Virtual Source Location Information for MPEG-4 SAC, IEEE 2005, 7 pages.
Moriya T., et al.,: A Design of Lossless Compression for High-Quality Audio Signals, 2004, 4 pages.
Notice of Allowance dated Aug. 25, 2008 by the Korean Patent Office for counterpart Korean Appln. Nos. 2008-7005851, 7005852; and 7005858.
Notice of Allowance dated Dec. 26, 2008 by the Korean Patent Office for counterpart Korean Appln. Nos. 2008-7005836, 7005838, 7005839, and 7005840.
Notice of Allowance dated Jan. 13, 2009 by the Korean Patent Office for a counterpart Korean Appln. No. 2008-7005992.
Office Action dated Jul. 21, 2008 issued by the Taiwan Patent Office, 16 pages.
Oh, E., et al.: Proposed changes in MPEG-4 BSAC multi channel audio coding, 2004, 7 pages, International Organisation for Standardisation.
Pang, H., et al., "Extended Pilot-Based Codling for Lossless Bit Rate Reduction of MPEG Surround", ETRI Journal, vol. 29, No. 1, Feb. 2007.
Puri, A., et al.: MPEG-4: An object-based multimedia coding standard supporting mobile applications, 1998, 28 pages, Baltzer Science Publishers BV.
Said, A.: On the Reduction of Entropy Coding Complexity via Symbol Grouping: I—Redundancy Analysis and Optimal Alphabet Partition, 2004, 42 pages, Hewlett-Packard Company.
Schroeder E F et al: DER MPEG-2STANDARD: Generische Codierung fur Bewegtbilder and zugehorige Audio-Information, 1994, 5 pages.

(56) References Cited

OTHER PUBLICATIONS

Schuijers, E. et al: Low Complexity Parametric Stereo Coding, 2004, 6 pages, Audio Engineering Society Convention Paper 6073.
Stoll, G.: MPEG Audio Layer II: A Generic Coding Standard for Two and Multichannel Sound for DVB, DAB and Computer Multimedia, 1995, 9 pages, International Broadcasting Convention, XP006528918.
Supplementary European Search Report corresponding to Application No. EP06747465, dated Oct. 10, 2008, 8 pages.
Supplementary European Search Report corresponding to Application No. EP06747467, dated Oct. 10, 2008, 8 pages.
Supplementary European Search Report corresponding to Application No. EP06757755, dated Aug. 1, 2008, 1 page.
Supplementary European Search Report corresponding to Application No. EP06843795, dated Aug. 7, 2008, 1 page.
Ten Kate W. R. Th., et al.: A New Surround-Stereo-Surround Coding Technique, 1992, 8 pages, J. Audio Engineering Society, XP002498277.
Voros P.: High-quality Sound Coding within 2x64 kbit/s Using Instantaneous Dynamic Bit-Allocation, 1988, 4 pages.
Webb J., et al.: Video and Audio Coding for Mobile Applications, 2002, 8 pages, The Application of Programmable DSPs in Mobile Communications.
USPTO Non-Final Office Action in U.S. Appl. No. 12/065,270, mailed Mar. 3, 2010, 29 pages.
Notice of Allowance issued in corresponding Korean Application Serial No. 2008-7007453, dated Feb. 27, 2009 (no English translation available).
"WD 2 for MPEG Surround", ITU Study Group 16—Video Coding Experts Group—ISO/IEC MPEG&ITU-T VCEG(ISO/IEC JTC1/SC29/WG11 and ITU-T SG16 Q6), No. N7387, Jul. 29, 2005, XP030013965.
Kristofer Kjorling: "Proposal for extended signalling in Spatial Audio", ITU Study Group 16—Video Coding Experts Group—ISO/IEC MPEG&ITU-T VCEG(ISO/IEC JTC1/SC29/WG11 and ITU-T SG16 Q6), No. M12361, Jul. 20, 2005, XP030041045.
Supplementary European Search Report for European Appln. No. 06798588.7, dated Feb. 28, 2011, 5 pages.
Korean Office Action dated Apr. 30, 2010 for Korean Patent Application No. KR10-2008-7005994, 12 pages.
Office Action, Japanese Application No. 2008-528948, mailed May 11, 2010, 6 pages with English translation.
Office Action, Japanese Application No. 2008-528949, mailed May 12, 2010, 4 pages with English translation.
"Text of second working draft for MPEG Surround", ISO/IEC JTC 1/SC 29/WG 11, No. N7387, No. N7387, Jul. 29, 2005, 140 pages.
Deputy Chief of the Electrical and Radio Engineering Department Makhotna, S.V., Russian Decision on Grant Patent for Russian Patent Application No. 2008112226 dated Jun. 5, 2009, and its translation, 15 pages.
Extended European search report for European Patent Application No. 06799105.9 dated Apr. 28, 2009, 11 pages.
Supplementary European Search Report for European Patent Application No. 06799058 dated Jun. 16, 2009, 6 pages.
Supplementary European Search Report for European Patent Application No. 06757751 dated Jun. 8, 2009, 5 pages.
Herre, J. et al., "Overview of MPEG-4 audio and its applications in mobile communication", Communication Technology Proceedings, 2000. WCC-ICCT 2000. International Confrence on Beijing, China held Aug. 21-25, 2000, Piscataway, NJ, USA, IEEE, US, vol. 1 (Aug. 21, 2008), pp. 604-613.
Oh, H-O et al., "Proposed core experiment on pilot-based coding of spatial parameters for MPEG surround", ISO/IEC JTC 1/SC 29/WG 11, No. M12549, Oct. 13, 2005, 18 pages XP030041219.
Pang, H-S, "Clipping Prevention Scheme for MPEG Surround", ETRI Journal, vol. 30, No. 4 (Aug. 1, 2008), pp. 606-608.
Quackenbush, S. R et al., "Noiseless coding of quantized spectral components in MPEG-2 Advanced Audio Coding", Application of Signal Processing to Audio and Acoustics, 1997. 1997 IEEE ASSP Workshop on New Paltz, NY, US held on Oct. 19-22, 1997, New York, NY, US, IEEE, US, (Oct. 19, 1997), 4 pages.
Russian Decision on Grant Patent for Russian Patent Application No. 2008103314 dated Apr. 27, 2009, and its translation, 11 pages.
USPTO Non-Final Office Action in U.S. Appl. No. 12/088,868, mailed Apr. 1, 2009, 11 pages.
USPTO Non-Final Office Action in U.S. Appl. No. 12/088,872, mailed Apr. 7, 2009, 9 pages.
USPTO Non-Final Office Action in U.S. Appl. No. 12/089,383, mailed Jun. 25, 2009, 5 pages.
USPTO Non-Final Office Action in U.S. Appl. No. 11/540,920, mailed Jun. 2, 2009, 8 pages.
USPTO Non-Final Office Action in U.S. Appl. No. 12/089,105, mailed Apr. 20, 2009, 5 pages.
USPTO Non-Final Office Action in U.S. Appl. No. 12/089,093, mailed Jun. 16, 2009, 10 pages.
Notice of Allowance dated Sep. 25, 2009 issued in U.S. Appl. No. 11/540,920.
Office Action dated Jul. 14, 2009 issued in Taiwan Application No. 095136561.
Notice of Allowance dated Apr. 13, 2009 issued in Taiwan Application No. 095136566.
Bosi, M., et al. "ISO/IEC MPEG-2 Advanced Audio Coding." *Journal of the Audio Engineering Society* 45.10 (Oct. 1, 1997): 789-812. XP000730161.
Ehrer, A., et al. "Audio Coding Technology of ExAC." *Proceedings of 2004 International Symposium on Hong Kong, China* Oct. 20, 2004, Piscataway, New Jersey. IEEE, 290-293. XP010801441.
Faller, Christof, "Parametric coding of spatial audio." 7th Int. Conf. on Digital Audio Effects, Naples, Italy, Oct. 5-8, 2004.
Ro, Yong Man et al. "MPEG-7 Homogeneous Texture Descriptor." ETRI Joun., vol. 23, No. 2, Jun. 2001.
European Search Report & Written Opinion for Application No. EP 06799113.3, dated Jul. 20, 2009, 10 pages.
European Search Report & Written Opinion for Application No. EP 06799111.7 dated Jul. 10, 2009, 12 pages.
European Search Report & Written Opinion for Application No. EP 06799107.5, dated Aug. 24, 2009, 6 pages.
European Search Report & Written Opinion for Application No. EP 06799108.3, dated Aug. 24, 2009, 7 pages.
International Preliminary Report on Patentability for Application No. PCT/KR2006/004332, dated Jan. 25, 2007, 3 pages.
Korean Intellectual Property Office Notice of Allowance for No. 10-2008-7005993, dated Jan. 13, 2009, 3 pages.
Korean Intellectual Property Office Notice of Office Action for No. 10-2008-7005994, dated Sep. 28, 2009, 7 pages.
Russian Notice of Allowance for Application No. 2008112174, dated Sep. 11, 2009, 13 pages.
Schuller, Gerald D.T., et al. "Perceptual Audio Coding Using Adaptive Pre- and Post-Filters and Lossless Compression." *IEEE Transactions on Speech and Audio Processing* New York, 10.6 (Sep. 1, 2002): 379. XP011079662.
Taiwan Examiner, Taiwanese Office Action for Application No. 095124113, dated Jul. 21, 2008, 13 pages.
Taiwanese Notice of Allowance for Application No. 95124070, dated Sep. 18, 2008, 7 pages.
Taiwanese Notice of Allowance for Application No. 95124112, dated Jul. 20, 2009, 5 pages.
Tewfik, A.H., et al. "Enhance wavelet based audio coder." *IEEE.* (1993): 896-900. XP010096271.
USPTO Non-Final Office Action in U.S. Appl. No. 11/514,302, mailed Sep. 9, 2009, 24 pages.
USPTO Notice of Allowance in U.S. Appl. No. 12/089,098, mailed Sep. 8, 2009, 19 pages.
Office Action, Japanese Appln. No. 2008-528950, dated May 31, 2011, 8 pages with English translation.
Canadian Office Action for Application No. 2620030 dated Mar. 31, 2010, 3 pages.

* cited by examiner

FIG. 4

| | Syntax | No. of bits | |
|---|---|---|---|
| | Syntax | No. of bits | |
| 401 | FramingInfo() | | |
| | { | | |
| 403 | bsFramingType; | | |
| 405 | bsNumParamSets; | 1 | |
| | if (bsFramingType) { | 3 | |
| | for (ps=0; ps<numParamSets; ps++) { | | |
| | if(ps==0){ | | |
| 407 | bsParamSlot[0]; | nBitsParamSlot(0) | 413 |
| | else{ | | |
| 409 | bsDiffParamSlot[ps]; | nBitsParamSlot(ps) | 415 |
| 411 | bsParamSlot[ps] = bsParamSlot[ps-1] + bsDiffParamSlot[ps] + 1; | | |
| | } | | |
| | } | | |
| | } | | |
| | } | | |

METHOD FOR DECODING AN AUDIO SIGNAL

TECHNICAL FIELD

The present invention relates to an audio signal processing, and more particularly, to an apparatus for decoding an audio signal and method thereof.

BACKGROUND ART

Generally, in case of an audio signal, an audio signal encoding apparatus compresses the audio signal into a mono or stereo type downmix signal instead of compressing each multi-channel audio signal. The audio signal encoding apparatus transfers the compressed downmix signal to a decoding apparatus together with a spatial information signal or stores the compressed downmix signal and a spatial information signal in a storage medium. In this case, a spatial information signal, which is extracted in downmixing a multi-channel audio signal, is used in restoring an original multi-channel audio signal from a downmix signal.

Configuration information is non-changeable in general and a header including this information is inserted in an audio signal once. Since configuration information is transmitted by being initially inserted in an audio signal once, an audio signal decoding apparatus has a problem in decoding spatial information due to non-existence of configuration information in case of reproducing the audio signal from a random timing point.

An audio signal encoding apparatus generates a downmix signal and a spatial information signal into bitstreams together or respectively and then transfers them to the audio signal decoding apparatus. So, if unnecessary information and the like are included in the spatial information signal, signal compression and transfer efficiencies are reduced.

DISCLOSURE

[Technical Problem]

An object of the present invention is to provide an apparatus for decoding an audio signal and method thereof, by which the audio signal can be reproduced from a random timing point by selectively including a spatial information signal in a header.

Another object of the present invention is to provide an apparatus for decoding an audio signal and method thereof, by which a position of a timeslot to which a parameter set will be applied can be efficiently represented using a variable bit number.

Another object of the present invention is to provide an apparatus for decoding an audio signal and method thereof, by which audio signal compression and transfer efficiencies can be raised by representing an information quantity required for performing a downmix signal arrangement or mapping multi-channel to a speaker as a minimal variable bit number.

A further object of the present invention is to provide an apparatus for decoding an audio signal and method thereof, by which an information quantity required for signal arrangement can be reduced by mapping multi-channel to a speaker without performing downmix signal arrangement.

[Technical Solution]

The aforesaid objectives, features and advantages of the invention will be set forth in the description which follows, and in part will be apparent from the description. Embodiments of the present invention which are capable of the aforesaid objectives will be set forth referring drawings accompanied.

Reference will now be made in detail to one preferred embodiment of the present invention, examples of which are illustrated in the accompanying drawings.

FIG. 1 is a configurational diagram of an audio signal transferred to an audio signal decoding apparatus from an audio signal encoding apparatus according to one embodiment of the present invention.

Referring to FIG. 1, an audio signal includes an audio descriptor 101, a downmix signal 103 and a spatial information signal 105.

In case of using a coding scheme for reproducing an audio signal for broadcasting or the like, the audio signal is able to include ancillary data as well as the audio descriptor 101 and the downmix signal 103. And, the present invention includes the spatial information signal 105 as the ancillary data. In order for an audio signal decoding apparatus to know basic information of audio codec without analyzing an audio signal, the audio signal is able to selectively include the audio descriptor 101. The audio descriptor 101 is configured with small number of basic informations necessary for audio decoding such as a transmission rate of a transmitted audio signal, a number of channels, a sampling frequency of compressed data, an identifier indicating a currently used codec and the like.

An audio signal decoding apparatus is able to know a type of a codec done to an audio signal using the audio descriptor 101. In particular, using the audio descriptor 101, the audio signal decoding apparatus is able to know whether an audio signal configures multi-channel using the spatial information signal 105 and the downmix signal 103. The audio descriptor 101 is located independently from the downmix signal 103 or the spatial information signal 105 included in the audio signal. For instance, the audio descriptor 101 is located within a separate field indicating an audio signal. In case that a header is not included in the downmix signal 103, the audio signal decoding apparatus is able to decode the downmix signal 103 using the audio descriptor 101.

The downmix signal 103 is a signal generated from downmixing multi-channel. And, the downmix signal 103 can be generated from a downmixing unit included in an audio signal encoding apparatus or generated artificially. The downmix signal 103 can be categorized into a case of including a header and a case of not including a header. In case that the downmix signal 103 includes a header, the header is included in each frame by a frame unit. In case that the downmix signal 103 does not include a header, as mentioned in the foregoing description, the downmix signal 103 can be decoded using the audio descriptor 101. The downmix signal 103 takes either a form of including a header for each frame or a form of not including a header in a frame. And, the downmix signal 103 is included in an audio signal in a same manner until contents end.

The spatial information signal 105 is also categorized into a case of including a header 107 and spatial information 111 and a case of including spatial information 111 only without including a header. The header 107 of the spatial information signal 105 differs from that of the downmix signal 103 in that it is unnecessary to be inserted in each frame identically. In particular, the spatial information signal 105 is able to use both a frame including a header and a frame not including a header together. Most of information included in the header 107 of the spatial information signal 105 is configuration information 109 that decodes spatial information 111 by interpreting the spatial information 111. The spatial information 111 is configured with frames each of which includes timeslots. The timeslot means each time interval in case of dividing the frame by time intervals. The number of timeslots included in one frame is included in the configuration information 109.

Configuration information 109 includes signal arrangement information, the number of signal converting units, channel configuration information, speaker mapping information and the like as well as the timeslot number.

The signal arrangement information is an identifier that indicates whether an audio signal will be arranged for upmixing prior to restoring the decoded downmix signal 103 into multi-channel.

The signal converting unit means an OTT (one-to-two) box converting one downmix signal 103 to two signals or a TTT (two-to-three) box converting two downmix signals 103 to three signals in generating multi-channel by upmixing the downmix signal 103. In particular, the OTT or TTT box is a conceptional box used in restoring multi-channel by being included in an upmixing unit (not shown in the drawing) of the audio signal decoding apparatus. And, information for types and number of the signal converting units is included in the spatial information signal 105.

The channel configuration information is the information indicating a configuration of the upmixing unit included in the audio signal decoding apparatus. The channel configuration information includes an identifier indicating whether an audio signal passes through the signal converting unit or not. The audio signal decoding apparatus is able to know whether an audio signal inputted to the upmixing unit passes through the signal converting unit or not using the channel configuration information. The audio signal decoding apparatus upmixes the downmix signal 103 into a multi-channel audio signal using the information for the signal converting unit, the channel configuration information and the like. The audio signal decoding apparatus generates multi-channel by upmixing the downmix signal 103 using the signal converting unit information, the channel configuration information and the like included in the spatial information 111.

The speaker mapping information is the information indicating that the multi-channel audio signal will be mapped to which speaker in outputting the multi-channel audio signals generated by upmixing to speakers, respectively. The audio signal decoding apparatus outputs the multi-channel audio signal to the corresponding speaker using the speaker mapping information included in the configuration information 109.

The spatial information 111 is the information used to give a spatial sense in generating multi-channel audio signals by the combination with the downmix signal. The spatial information includes CLDs (Channel Level Differences) indicating an energy difference between audio signals, ICCs (Interchannel Correlations) indicating close correlation or similarity between audio signals, CPCs (Channel Prediction Coefficients) indicating a coefficient to predict an audio signal value using other signals and the like. And, a parameter set indicates a bundle of these parameters.

And, a frame identifier indicating whether a position of a timeslot to which a parameter set is applied is fixed or not, the number of parameter set applied to one frame, position information of a timeslot to which a parameter set is applied and the like as well as the parameters are included in the spatial information 111.

FIG. 2 is a flowchart of a method of decoding an audio signal according to another embodiment of the present invention.

Referring to FIG. 2, an audio signal decoding apparatus receives a spatial information signal 105 transferred in a bitstream form by an audio signal encoding apparatus (S201). The spatial information signal 105 can be transferred in a stream form separate from that of a downmix signal 103 or transferred by being included in ancillary data or extension data of the downmix signal 103.

In case that the spatial information signal 105 is transferred by being combined with the downmix signal 103, a demultiplexing unit (not shown in the drawing) of an audio signal decoding apparatus separates the received audio signal into an encoded downmix signal 103 and an encoded spatial information signal 105. The encoded spatial information 105 signal includes a header 107 and spatial information 111. The audio signal decoding apparatus decides whether the header 107 is included in the spatial information signal 105 (S203).

If the header 107 is included in the spatial information signal 105, the audio signal decoding apparatus extracts configuration information 109 from the header 107 (S205).

The audio signal decoding apparatus decides whether the configuration information is extracted from a first header 107 included in the spatial information signal 105 (S207).

If the configuration information 109 is extracted from the header 107 extracted first from the spatial information signal 105, the audio signal decoding apparatus decodes the configuration information 109 (S215) and decodes the spatial information 111 transferred behind the configuration information 109 according to the decoded configuration information 109.

If the header 107 extracted from the audio signal is not the header 107 extracted first from the spatial information signal 105, the audio signal decoding apparatus decides whether the configuration information 109 extracted from the header 107 is identical to the configuration information 109 extracted from a first header 107 (S209).

If the configuration information 109 is identical to the configuration information 109 extracted from the first header 107, the audio signal decoding apparatus decodes the spatial information 111 using the decoded configuration information 109 extracted from the first header 107. If the extracted configuration information 109 is not identical to the configuration information 109 extracted from the first header 107, the audio signal decoding apparatus decides whether an error occurs in the audio signal on a transfer path from the audio signal encoding apparatus to the audio signal decoding apparatus (S211).

If the configuration information 109 is variable, the error does not occur even if the configuration information 109 is not identical to the configuration information 109 extracted from the first header 107. Hence, the audio signal decoding apparatus updates the header 107 into a variable header 107 (S213). The audio signal decoding apparatus then decodes configuration information 109 extracted from the updated header 107 (S215).

The audio signal decoding apparatus decodes spatial information 111 transferred behind the configuration information 109 according to the decoded configuration information 109.

If the configuration information 109, which is not variable, is not identical to the configuration information 109 extracted from the first header 107, it means that the error occurs on the audio signal transfer path. Hence, the audio signal decoding apparatus removes the spatial information 111 included in the spatial information signal 105 including the erroneous configuration information 109 or corrects the error of the spatial information 111 (S217).

FIG. 3 is a flowchart of a method of decoding an audio signal according to another embodiment of the present invention.

Referring to FIG. 3, an audio signal decoding apparatus receives an audio signal including a downmix signal 103 and a spatial information signal 105 from an audio signal encoding apparatus (S301).

The audio signal decoding apparatus separates the received audio signal into the spatial information signal 105 and the downmix signal 103 (S303) and then sends the separated spatial information 105 and the separated downmix signal 103 to a core decoding unit (not shown in the drawing) and a spatial information decoding unit (not shown in the drawing), respectively.

The audio signal decoding apparatus extracts the number of timeslots and the number of parameter sets from the spatial information signal 105. The audio signal decoding apparatus finds a position of a timeslot to which a parameter set will be applied using the extracted numbers of the timeslots and the parameter sets. According to an order of the corresponding parameter set, the position of the timeslot to which the corresponding parameter set will be applied is represented as a variable bit number. And, by reducing the bit number representing the position of the timeslot to which the corresponding parameter set will be applied, it is able to efficiently represent the spatial information signal 105. And, the position of the timeslot, to which the corresponding parameter set will be applied, will be explained in detail with reference to FIG. 4 and FIG. 5.

Once the timeslot position is obtained, the audio signal decoding apparatus decodes the spatial information signal 105 by applying the corresponding parameter set to the corresponding position (S305). And, the audio signal decoding apparatus decodes the downmix signal 103 in the core decoding unit (S305).

The audio signal decoding apparatus is able to generate multi-channel by upmixing the decoded downmix signal 103 as it is. But the audio signal decoding apparatus is able to arrange a sequence of the decoded downmix signals 103 before the audio signal decoding apparatus upmix the corresponding signals (S307).

The audio signal decoding apparatus generates multi-channel using the decoded downmix signal 103 and the decoded spatial information signal 105 (S309). The audio signal decoding apparatus uses the spatial information signal 105 to generate the downmix signal 103 into multi-channel. As mentioned in the foregoing description, the spatial information signal 105 includes the number of signal converting units and channel configuration information for representing whether the downmix signal 103 passes through the signal converting unit in being upmixed or is outputted without passing through the signal converting unit. The audio signal decoding apparatus upmixes the downmix signal 103 using the number of signal converting units, the channel configuration information and the like (S309). A method of representing the channel configuration information and a method of configuring the channel configuration information using the less number of bits will be explained with reference to FIG. 6 and FIG. 7 later.

The audio signal decoding apparatus maps a multi-channel audio signal to a speaker in a preset sequence to output the generated multi-channel audio signals (S311). In this case, as the mapped audio signal sequence increases, the bit number for mapping the multi-channel audio signal to the speaker becomes reduced. In particular, in case that numbers are given to multi-channel audio signals in order, since a first audio signal can be mapped to one of the entire speakers, an information quantity required for mapping an audio signal to a speaker is greater than that required for mapping a second or subsequent audio signal. As the second or subsequent audio signal is mapped to one of the rest of the speakers excluding the former speaker mapped with the former audio signal, the information quantity required for the mapping is reduced. In particular, by reducing the information quantity required for mapping the audio signal as the mapped audio signal sequence increases, it is able to efficiently represent the spatial information signal 105. This method is applicable to a case of arranging the downmix signals 103 in the step S307 as well.

FIG. 4 is syntax of position information of a timeslot to which a parameter set is applied according to one embodiment of the present invention.

Referring to FIG. 4, the syntax relates to 'FramingInfo' 401 to represent information for a number of parameter sets and information for a timeslot to which a parameter set is applied.

'bsFramingType' field 403 indicates whether a frame included in the spatial information signal 105 is a fixed frame or a variable frame. The fixed frame means a frame in which a timeslot position to which a parameter set will be applied is previously set. In particular, a position of a timeslot to which a parameter set will be applied is decided according to a preset rule. The variable frame means a frame in which a timeslot position to which a parameter set will be applied is not set yet. So, the variable frame further needs timeslot position information for representing a position of a timeslot to which a parameter set will be applied. In the following description, the 'bsFramingType' 403 shall be named 'frame identifier' indicating whether a frame is a fixed frame or a variable frame.

In case of a variable frame, 'bsParamSlot' field 407 or 411 indicates position information of a timeslot to which a parameter set will be applied. The 'bsParamSlot[0]' field 407 indicates a position of a timeslot to which a first parameter set will be applied, and the 'bsParamSlot[ps]' field 411 indicates a position of a timeslot to which a second or subsequent parameter set will be applied. The position of the timeslot to which the first parameter set will be applied is represented as an initial value, and a position of the timeslot to which the second or subsequent parameter set will be applied is represented as a difference value 'bsDiffParamSlot[ps]' 409, i.e., a difference between 'bsParamSlot[ps]' and 'bsParamSlot[ps−1]'. In this case, 'ps' means a parameter set. The first parameter set is represented as 'ps=0'. And, 'ps' is able to represent value ranging from 0 to a value smaller than the number of total parameter sets.

(i) A timeslot position 407 or 409 to which a parameter set will be applied increases as a ps value increases (bsParamSlot[ps]>bsParamSlot[ps−1]). (ii) For a first parameter set, a maximum value of a timeslot position to which a first parameter set will be applied corresponds to a value resulting from adding 1 to a difference between a timeslot number and a parameter set number and a timeslot position is represented as an information quantity of 'nBitsParamSlot(0)' 413. (iii) For a second or subsequent parameter set, a timeslot position to which an Nth parameter set will be applied is greater by at least 1 than a timeslot position to which an (N−1)th parameter set will be applied and is even able to have a value resulting from adding a value N to a value resulting from subtracting a parameter set number from a timeslot number. A timeslot position 'bsParamSlot[ps]' to which a second or subsequent parameter set will be applied is represented as a difference value 'bsDiffParamSlot[ps]' 409. And, this value is represented as an information quantity of 'nBitsParamSlot[ps]'. So, it is able to find a timeslot position to which a parameter set will be applied using the (i) to (iii).

For instance, if there are ten timeslots included in one spatial frame and if there are three parameter sets, a timeslot position to which a first parameter set (ps=0) will be applied is applicable to a timeslot position resulting from adding 1 to a value resulting from subtracting a total parameter number from a total timeslot number. In particular, the corresponding position is applicable to one of timeslots belonging to a range between 1 to maximum 8. By considering that a timeslot position to which a parameter set will be applied increases according to a parameter set number, it can be understood that timeslot positions to which the remaining two parameter sets are applicable are maximum 9 and 10, respectively. So, the timeslot position 407 to which the first parameter set will be applied needs three bits to indicate 1 to 8, which can be represented as $\mathrm{ceil}\{\log_2(k-i+1)\}$. In this case, 'k' is the number of timeslots and 'i' is the number of parameters.

If the timeslot position 407 to which the first parameter set will be applied is '5', the timeslot position 'bsParamSlot[1]' to which the second parameter set will be applied should be selected from values between '5+1=6' and '10−3+2=9'. In particular, the timeslot position to which the second parameter set will be applied can be represented as a value resulting from adding a difference value 'bsDiffParamSlot[ps]' 409 to a value resulting from adding 1 to the timeslot position to which the first parameter set will be applied. So, the difference value 409 is able to correspond to 0 to 3, which can be represented as two bits. For the second or subsequent parameter set, by representing a timeslot position to which a parameter set will be applied as the difference value 409 instead of representing the timeslot position in direct, it is able to reduce the bit number. In the former example, four bits are needed to represent one of 6 to 9 in case of representing the timeslot position in direct. Yet, only two bits are needed to represent a timeslot position as the difference value.

Hence, a position information indicating quantity 'nBitsParamSlot(0)' or 'nBitsParamSlot(ps)' 413 or 415 of a timeslot to which a parameter set will be applied can be represented not as a fixed bit number but as a variable bit number.

FIG. 5 is a flowchart of a method of decoding a spatial information signal by applying a parameter set to a timeslot according to another embodiment of the present invention.

Referring to FIG. 5, an audio signal decoding apparatus receives an audio signal including a downmix signal 103 and a spatial information signal 105 (S501).

If a header 107 exists in the spatial information signal, the audio signal decoding apparatus extracts the number of timeslots included in a frame from configuration information 109 included in the header 107 (S503). If a header 107 is not included in the spatial information signal 105, the audio signal decoding apparatus extracts the number of timeslots from the configuration information 109 included in a previously extracted header 107.

The audio signal decoding apparatus extracts the number of parameter sets to be applied to a frame from the spatial information signal 105 (S505).

The audio signal decoding apparatus decides whether positions of timeslots, to which parameter sets will be applied, in a frame are fixed or variable using a frame identifier included in the spatial information signal 105 (S507).

If the frame is a fixed frame, the audio signal decoding apparatus decodes the spatial information signal 105 by applying the parameter set to the corresponding slot according to a preset rule (S513).

If the frame is a variable frame, the audio signal decoding apparatus extracts information for a timeslot position to which a first parameter set will be applied (S509). As mentioned in the foregoing description, the timeslot position to which the first parameter will be applied can maximally be a value resulting from adding 1 to a difference between the timeslot number and the parameter set number.

The audio signal decoding apparatus obtains information for a timeslot position to which a second or subsequent parameter set will be applied using the information for the timeslot position to which the first parameter set will be applied (S511). If N is a natural number equal to or greater than 2, a timeslot position to which a parameter set will be applied can be represented as a minimum bit number using a fact that a timeslot position to which an Nth parameter set will be applied is greater by at least 1 than a timeslot position to which an (N−1)th parameter set will be applied and even can have a value resulting from adding N to a value resulting from subtracting the parameter set number from the timeslot number.

And, the audio signal decoding apparatus decodes the spatial information signal 105 by applying the parameter set to the obtained timeslot position (S513).

FIG. 6 and FIG. 7 are diagrams of an upmixing unit of an audio signal decoding apparatus according to one embodiment of the present invention.

An audio signal decoding apparatus separates an audio signal received from an audio signal encoding apparatus into a downmix signal 103 and a spatial information signal 105 and then decodes the downmix signal 103 and the spatial information signal 105 respectively. As mentioned in the foregoing description, the audio signal decoding apparatus decodes the spatial information signal 105 by applying a parameter to a timeslot. And, the audio signal decoding apparatus generates multi-channel audio signals using the decoded downmix signal 103 and the decoded spatial information signal 105.

If the audio signal encoding apparatus compresses N input channels into M audio signals and transfers the M audio signals in a bitstream form to the audio signal decoding apparatus, the audio signal decoding apparatus restores and output the original N channels. This configuration is called an N-M-N structure. In some cases, if the audio signal decoding apparatus is unable to restore the N channels, the downmix signal 103 is outputted into two stereo signals without considering the spatial information signal 105. Yet, this will not be further discussed. A structure, in which values of N and M are fixed, shall be called a fixed channel structure. A structure, in which values of M and N are represented as random values, shall be called a random channel structure. In case of such a fixed channel structure as 5-1-5, 5-2-5, 7-2-7 and the like, the audio signal encoding apparatus transfers an audio signal by having a channel structure included in the audio signal. The audio signal decoding apparatus then decodes the audio signal by reading the channel structure.

The audio signal decoding apparatus uses an upmixing unit including a signal converting unit to restore M audio signals into N multi-channel. The signal converting unit is a conceptional box used to convert one downmix signal 103 to two signals or convert two downmix signals 103 to three signals in generating multi-channel by upmixing downmix signals 103.

The audio signal decoding apparatus is able to obtain information for a structure of the upmixing unit by extracting channel configuration information from the configuration information 109 included in the spatial information signal 105. As mentioned in the foregoing description, the channel configuration information is the information indicating a configuration of the upmixing unit included in the audio signal decoding apparatus. The channel configuration information includes an identifier that indicates whether an audio signal passes through the signal converting unit. In particular, the channel configuration information can be represented as a segmenting identifier since the numbers of input and output signals of the signal converting unit are changed in case that a decoded downmix signal passes through the signal converting unit in the upmixing unit. And, the channel configuration information can be represented as a non-segmenting identifier since an input signal of the signal converting unit is outputted intact in case that a decoded downmix signal does not pass through the signal converting unit included in the upmixing unit. In the present invention, the segmenting identifier shall be represented as '1' and the non-segmenting identifier shall be represented as '0'.

The channel configuration information can be represented in two ways, a horizontal method and a vertical method.

In the horizontal method, if an audio signal passes through a signal converting unit, i.e., if channel configuration information is '1', whether a lower layer signal outputted via the signal converting unit passes through another signal converting unit is sequentially indicated by the segmenting or non-segmenting identifier. If channel configuration information is '0', whether a next audio signal of a same or upper layer passes through a signal converting unit is indicated by the segmenting or non-segmenting identifier.

In the vertical method, whether each of entire audio signals of an upper layer passes through a signal converting unit is sequentially indicated by the segmenting or non-segmenting identifier regardless of whether an audio signal of an upper layer passes through a signal converting unit and then whether an audio signal of a lower layer passes through a signal converting unit is indicated.

For the structure of the same upmixing unit, FIG. 6 exemplarily shows that channel configuration information is represented by the horizontal method and FIG. 7 exemplarily shows that channel configuration information is represented by the vertical method. In FIG. 6 and FIG. 7, a signal converting unit employs an OTT box for example.

Referring to FIG. 6, four audio signals $X_1$ to $X_4$ enter an upmixing unit. $X_1$ enters a first signal converting unit and is then converted to two signals 601 and 603. The signal converting unit included in the upmixing unit converts the audio signal using spatial parameters such as CLD, ICC and the like. The signals 601 and 603 converted by the first signal converting unit enter a second converting unit and a third converting unit to be outputted as multi-channel audio signals $Y_1$ to $Y_4$. $X_2$ enters a fourth signal converting unit and is then outputted as $Y_5$ and $Y_6$. And, $X_3$ and $X_4$ are directly outputted without passing through signal converting units.

Since $X_1$ passes through the first signal converting unit, channel configuration information is represented as a segmenting identifier '1'. Since the channel configuration information is represented by the horizontal method in FIG. 6, if the channel configuration information is represented as the segmenting identifier, whether the two signals 601 and 603 outputted via the first signal converting unit pass through another signal converting units is sequentially represented as a segmenting or non-segmenting identifier.

The signal 601 of the two output signals of the first signal converting unit passes through the second signal converting unit, thereby being represented as a segmenting identifier 1. The signal via the second signal converting unit is outputted intact without passing through another signal converting unit, thereby being represented as a non-segmenting identifier 0.

If channel configuration information is '0', whether a next audio signal of a same or upper layer passes through a signal converting unit is represented as a segmenting or non-segmenting identifier. So, channel configuration information is represented for the signal $X_2$ of the upper layer.

$X_2$, which passes through the fourth signal converting unit, is represented as a segmenting identifier 1. Signals through the fourth signal converting unit are directly outputted as $Y_5$ and $Y_6$, thereby being represented as non-segmenting identifiers 0, respectively.

$X_3$ and $X_4$, which are directly outputted without passing through signal converting units, are represented as non-segmenting identifiers 0, respectively.

Hence, the channel configuration information is represented as 110010010000 by the horizontal method. In this case, the channel configuration information is extracted through the configuration of the upmixing unit for convenience of understanding. Yet, the audio signal decoding apparatus reads the channel configuration information to obtain the information for the structure of the upmixing unit in a reverse way.

Referring to FIG. 7, like FIG. 6, four audio signals $X_1$ to $X_4$ enter an upmixing unit. Since channel configuration information is represented as a segmenting or non-segmenting identifier from an upper layer to a lower layer by the vertical method, identifiers of audio signals of a first layer 701 as a most upper layer are represented in sequence. In particular, since $X_1$ and $X_2$ pass though first and fourth signal converting units, respectively, each channel configuration information becomes 1. Since $X_3$ and $X_4$ doe not pass through signal converting units, each channel configuration information becomes 0. So, the channel configuration information of the first layer 701 becomes 1100. In the same manner, if represented in sequence, channel configuration information of a second layer 703 and a third layer 705 become 1100 and 0000, respectively. Hence, the entire channel configuration information represented by the vertical method becomes 110011000000.

An audio signal decoding apparatus reads the channel configuration information and then configures an upmixing unit. In order for the audio signal decoding apparatus to configure the upmixing unit, an identifier indicating that whether the channel configuration is represented by the horizontal method or the vertical method should be included in an audio signal. Alternatively, channel configuration information is basically represented by the horizontal method. Yet, if it is efficient to represent channel configuration information by the vertical method, an audio signal encoding apparatus may enable an identifier indicating that channel configuration is represented by the vertical method to be included in an audio signal.

An audio signal decoding apparatus reads channel configuration information represented by the horizontal method and is then able to configure an upmixing unit. Yet, in case of channel configuration information is represented by the vertical method, an audio signal decoding apparatus is able to configure an upmixing unit only if knowing the number of signal converting units included in the upmixing unit or the numbers of input and output channels. So, an audio signal decoding apparatus is able to configure an upmixing unit in a manner of extracting the number of signal converting units or the numbers of input and output channels from the configuration information 109 included in the spatial information signal 105.

An audio signal decoding apparatus interprets channel configuration information in sequence from a front. In case of detecting the number of segmenting identifiers 1 includes in the channel configuration information as many as the number of signal converting units extracted from the configuration information, the audio signal decoding apparatus needs not to further read the channel configuration information. This is because the number of segmenting identifiers 1 included in the channel configuration information is equal to the number of signal converting units included in the upmixing unit as the segmenting identifier 1 indicates that an audio signal is inputted to the signal converting unit.

In particular, as mentioned in the forgoing example, if channel configuration information represented by the vertical method is 110011000000, an audio signal decoding apparatus needs to read total 12 bits in order to decode the channel configuration information. Yet, if the audio signal decoding apparatus detects that the number of signal converting units is 4, the audio signal decoding apparatus decodes the channel configuration information until the number of is included in the channel configuration information appears four times. Namely, the audio signal decoding apparatus decodes the channel configuration information up to 110011 only. This is because the rest of values are represented as non-segmenting identifiers 0 despite not using the channel configuration information further. Hence, as it is unnecessary for the audio signal decoding apparatus to decode six bits, decoding efficiency can be enhanced.

In case that a channel structure is a preset fixed channel structure, additional information is unnecessary since the number of signal converting units or the numbers of input and output channels are included in configuration information that is included in the spatial information signal 105. Yet, in case that a channel structure is a random channel structure of which channel structure is not decided yet, additional information is necessary to indicate the number of signal converting units or the numbers of input and output channels since the number of signal converting units or the numbers of input and output channels are not included in the spatial information signal 105.

For example of information for a signal converting unit, in case of using an OTT box only as a signal converting unit, information for indicating the signal converting unit can be represented as maximum 5 bits. In case that an input signal entering an upmixing unit passes through an OTT or TTT box, one input signal is converted to two signals or two input signals are converted to three signals. So, the number of output channels becomes a value resulting from adding the number of OTT or TTT boxes to the input signal. Hence, the number of the signal converting units becomes a value resulting from subtracting the number of input signals and the number of TTT boxes from the number of output channels. Since it is able to use maximum 32 output channels in general, information for indicating signal converting units can be represented as a value within five bits.

Accordingly, if channel configuration information is represented by the vertical method and if a channel structure is a random channel structure, an audio signal encoding apparatus separately should represent the number of signal converting units as maximum five bits in the spatial information signal 105. In the above example, 6-bit channel configuration information and 5-bit information for indicating signal converting units are needed. Namely, total eleven bits are required. This indicates that a bit quantity required for configuring an upmixing unit is reduced rather than the channel configuration information represented by the horizontal method. Therefore, if channel configuration information is represented by the vertical method, the bit number can be reduced.

FIG. 8 is a block diagram of an audio signal decoding apparatus according to one embodiment of the present invention.

Referring to FIG. 8, an audio signal decoding apparatus according to one embodiment of the present invention includes a receiving unit, a demultiplexing unit, a core decoding unit, a spatial information decoding unit, a signal arranging unit, a multi-channel generating unit and a speaker mapping unit.

The receiving unit 801 receives an audio signal including a downmix signal 103 and a spatial information signal 105.

The demultiplexing unit 803 parses the audio signal received by the receiving unit 801 into an encoded downmix signal 103 and an encoded spatial information signal 105 and then sends the encoded downmix signal 103 and the encoded spatial information signal to the core decoding unit 805 and the spatial information decoding unit 807, respectively.

The coder decoding unit 805 and the spatial information decoding unit 807 decode the encoded downmix signal and the encoded spatial information signal, respectively.

As mentioned in the foregoing description, the spatial information decoding unit 807 decodes the spatial information signal 105 by extracting a frame identifier, a timeslot number, a parameter set number, timeslot position information and the like from the spatial information signal 105 and by applying a parameter set to a corresponding timeslot.

The audio signal decoding apparatus is able to include the signal arranging unit 809. The signal arranging unit 809 arranges a plurality of downmix signals according to a preset arrangement to upmix the decoded downmix signal 103. In particular, the signal arranging unit 809 arranges M downmix signals into M' audio signals in an N-M-N channel configuration.

The audio signal decoding apparatus directly can upmix downmix signals according to a sequence that the downmix signals have passed through the core decoding unit 805. Yet, in some cases, the audio signal decoding apparatus may perform upmixing after the audio signal decoding apparatus arranges a sequence of downmix signals.

Under certain circumstances, signal arrangement can be performed on signals entering a signal converting unit that upmixes two downmix signals into three signals.

In case of performing signal arrangement on audio signals or in case of performing signal arrangement on an input signal of a TTT box only, signal arrangement information indicating the corresponding case should be included in the audio signal by the audio signal encoding apparatus. IN this case, the signal arrangement information is an identifier indicating whether signal sequences will be arranged for upmixing prior to restoring an audio signal into multi-channel, whether arrangement will be performed on a specific signal only, or the like.

If a header 107 is included in the spatial information signal 105, the audio signal decoding apparatus arranges downmix signals using the audio signal arrangement information included in configuration information 109 extracted from the header 107.

If a header 107 is not included in the spatial information signal 105, the audio signal decoding apparatus is able to arrange audio signals using the audio signal arrangement information extracted from configuration information 109 included in a previous header 107.

The audio signal decoding apparatus may not perform the downmix signal arrangement. In particular, the audio signal decoding apparatus is able to generate multi-channel by directly upmixing the signal decoded and transferred to the multi-channel generating unit 811 by the core decoding unit 805 instead of performing downmix signal arrangement. This is because a desired purpose of the signal arrangement can be achieved by mapping the generated multi-channel to speakers. In this case, it is able to compress and transfer an audio signal more efficiently by not inserting information for the downmix signal arrangement in the audio signal. And, complexity of the decoding apparatus can be reduced by not, performing the signal arrangement additionally.

The signal arranging unit 809 sends the arranged downmix signal to the multi-channel generating unit 811. And, the spatial information decoding unit 809 sends the decoded spatial information signal 105 to the multi-channel generating unit 811 as well. And, the multi-channel generating unit 811 generates a multi-channel audio signal using the downmix signal 103 and the spatial information signal 105.

The audio signal decoding apparatus includes the speaker mapping unit 813 to output an audio signal through the multi-channel generating unit 811 to a speaker.

The speaker mapping unit 813 decides that the multi-channel audio signal will be outputted by being mapped to which speaker. And, types of speakers used to output audio signals in general are shown in Table 1 as follows.

TABLE 1

| BsOutputChannelPos | Loudspeaker |
|---|---|
| 0 | FL: Front Left |
| 1 | FR: Front Right |
| 2 | FC: Front Center |
| 3 | LFE: Low Frequency Enhancement |
| 4 | BL: Back Left |
| 5 | BR: Back Right |
| 6 | FLC: Front Left Center |
| 7 | FRC: front Right Center |
| 8 | BC: Back Center |
| 9 | SL: Side Left |
| 10 | SR: Side Right |
| 11 | TC: Top Center |
| 12 | TFL: Top Front Left |
| 13 | TFC: Top Front Center |
| 14 | TFR: Top Front Right |
| 15 | TBL: Top Back Left |
| 16 | TBC: Top Back Center |
| 17 | TBR: Top Back Right |
| 18 . . . 31 | Reserved |

Generally, maximum 32 speakers are available for being mapped to an outputted audio signal. So, as shown in Table 1, the speaker mapping unit 813 enables the audio signal to be mapped to the speaker (Loudspeaker) corresponding to each number in a manner of giving a specific one of numbers (bsOutputChannelPos) between 0 and 31 to the multi-channel audio signal. In this case, since one of total 32 speakers should be selected to map a first audio signal among multi-channel audio signals outputted from the multi-channel generating unit 811 to a speaker, 5 bits are needed. Since one of the remaining 31 speakers should be selected to map a second audio signal to a speaker, 5 bits are needed as well. According to this method, since one of the remaining 16 speakers should be selected to map a seventeenth audio signal to a speaker, 4 bits are needed. In particular, as the number of mapping audio signals increases, an information quantity required for indicating speakers mapped to audio signals decreases. This can be expressed by $\mathrm{ceil}[\log_2(32\text{-bsOutputChannelPos})]$ representing the bit number required for mapping an audio signal to a speaker. The required bit number decreases due to the increase of the number of audio signals to be arranged, which can be applicable to the case that the number of downmix signals arranged by the signal arranging unit 809 increases. Thus, the audio decoding apparatus maps the multi-channel audio signal to a speaker and then outputs the corresponding signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Advantageous Effects

Accordingly, by an apparatus for decoding an audio signal and method thereof according to the present invention, a header can be selectively included in a spatial information signal.

By an apparatus for decoding an audio signal and method thereof according to the present invention, a transferred data quantity can be reduced in a manner of representing a position of a timeslot to which a parameter set will be applied as a variable bit number.

By an apparatus for decoding an audio signal and method thereof according to the present invention, audio signal compression and transfer efficiencies can be raised in a manner of representing an information quantity required for performing downmix signal arrangement or for mapping multi-channel to a speaker as a minimum variable bit number.

By an apparatus for decoding an audio signal and method thereof according to the present invention, an audio signal can be more efficiently compressed and transferred and complexity of an audio signal decoding apparatus can be reduced, in a manner of upmixing signals decoded and transferred to a multi-channel generating unit by a core decoding unit in a sequence without performing downmix signal arrangement.

BRIEF DESCRIPTION OF THE DRAWINGS

FIG. 4 is syntax of position information of a timeslot to which a parameter set is applied according to one embodiment of the present invention.

BEST MODE

Figure 1:
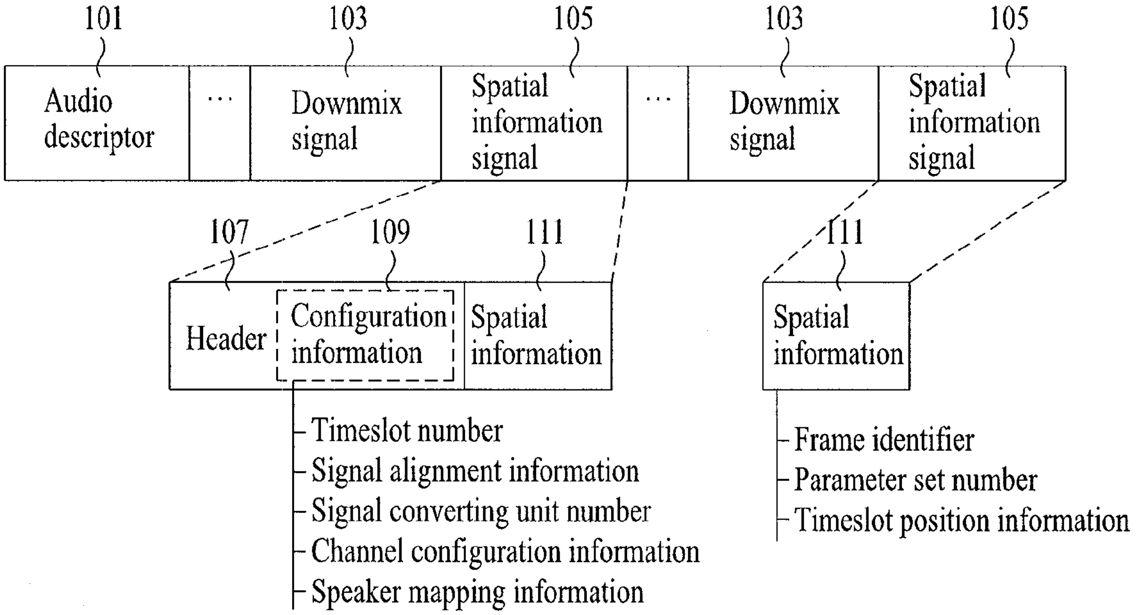
FIG. 1 is a configurational diagram of an audio signal according to one embodiment of the present invention.
Figure 2:
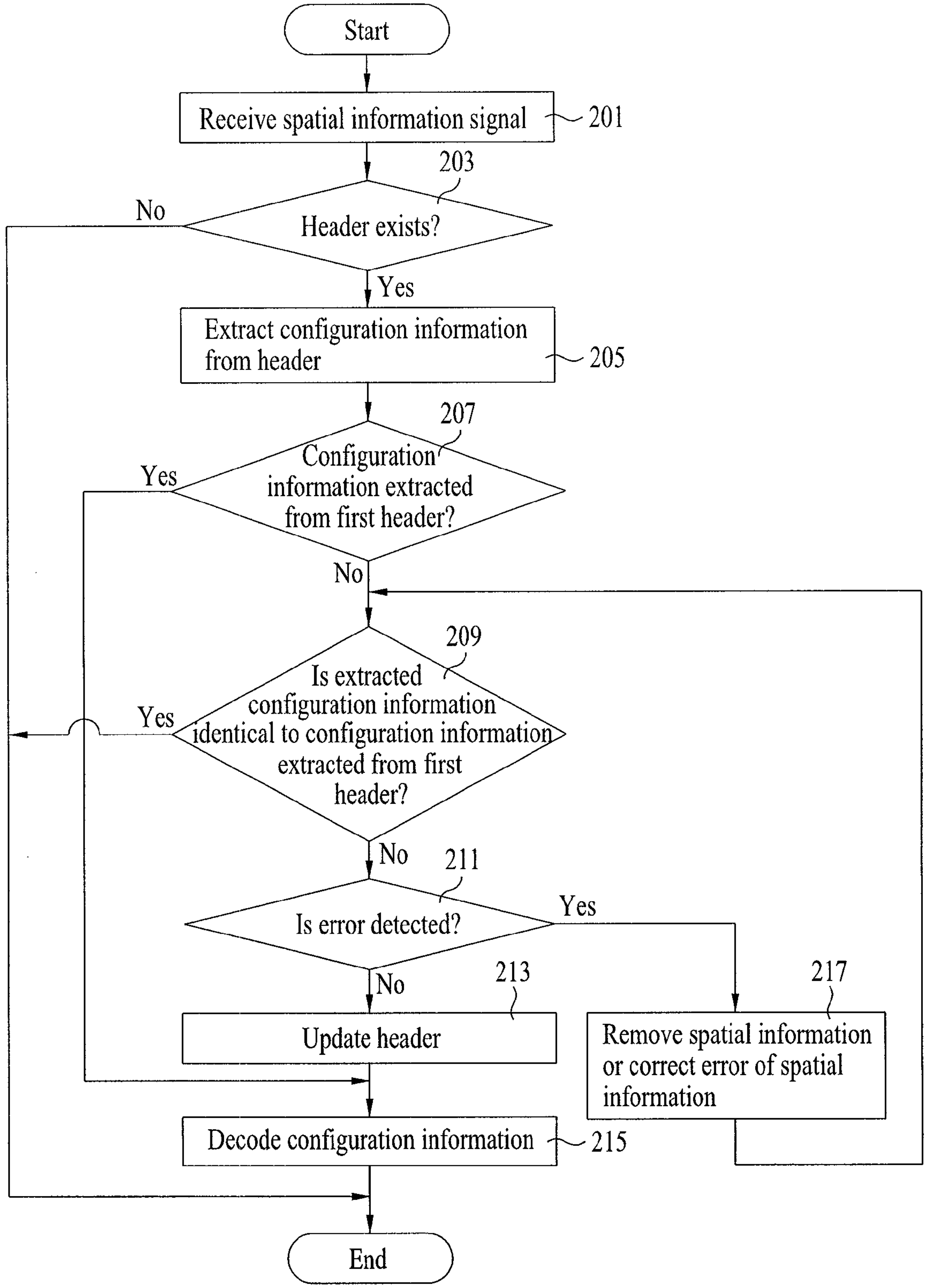
FIG. 2 is a flowchart of a method of decoding an audio signal according to another embodiment of the present invention.
Figure 3:
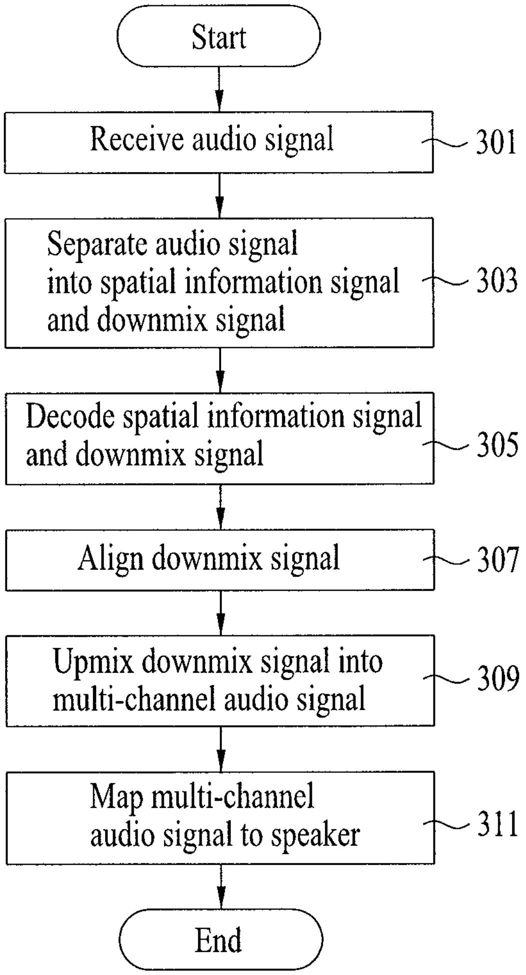
FIG. 3 is a flowchart of a method of decoding an audio signal according to another embodiment of the present invention.
Figure 5:
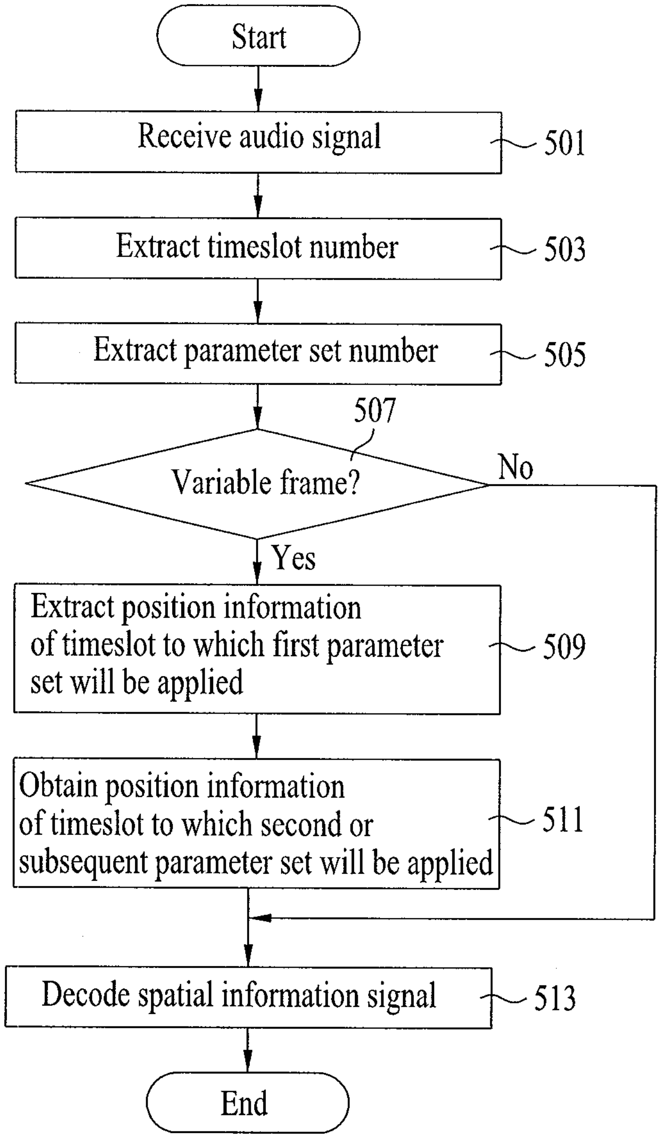
FIG. 5 is a flowchart of a method of decoding a spatial information signal by applying a parameter set to a timeslot according to another embodiment of the present invention.
Figure 6:
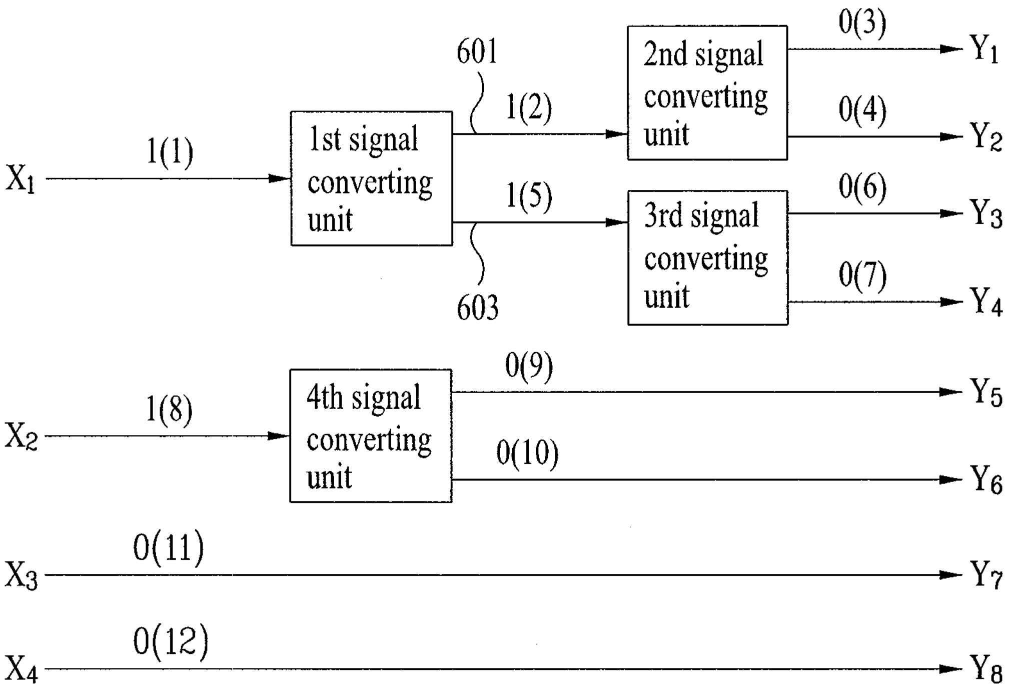
FIG. 6 and FIG. 7 are diagrams of an upmixing unit of an audio signal decoding apparatus according to one embodiment of the present invention.
Figure 7:
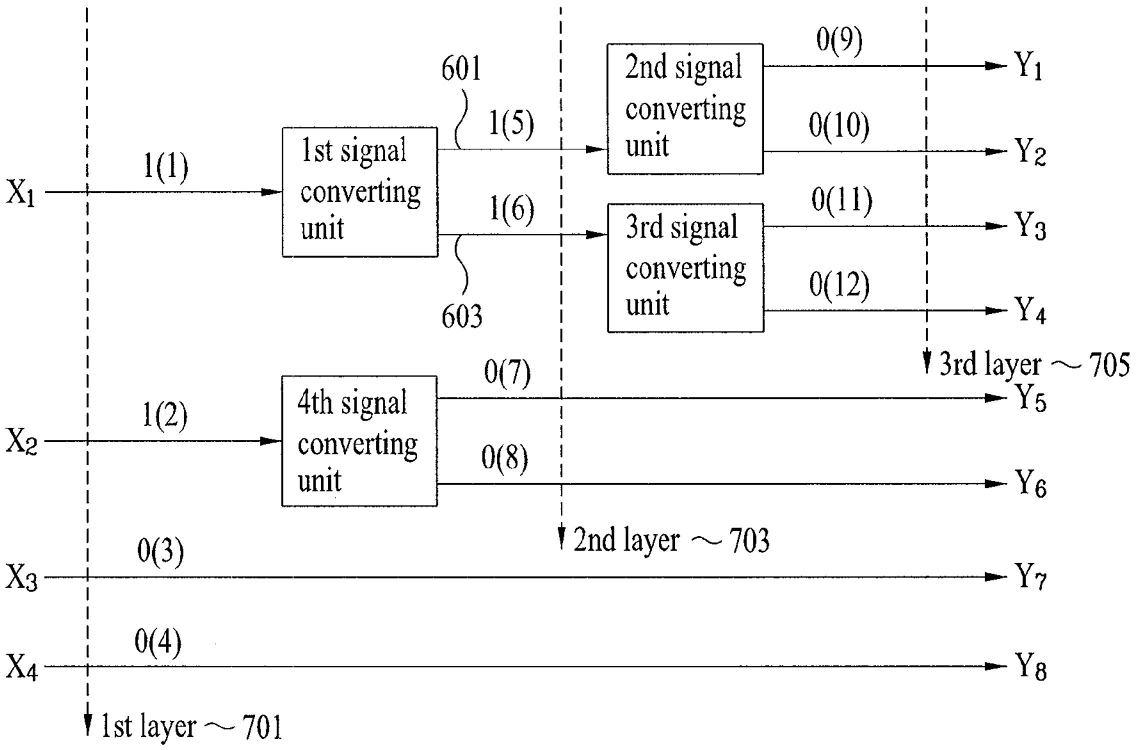
Figure 8:
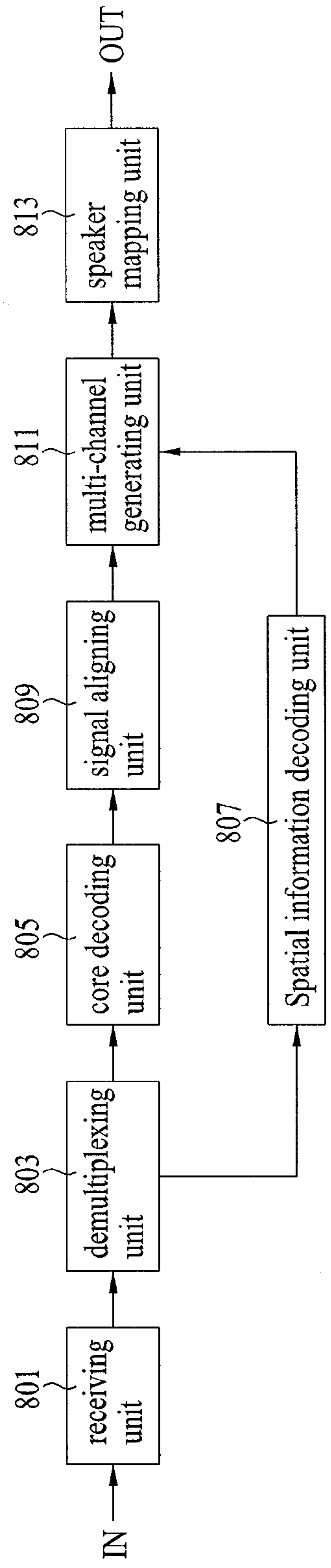
FIG. 8 is a block diagram of an audio signal decoding apparatus according to one embodiment of the present invention.

To achieve these and other advantages, according to an aspect of the present invention, there is provided a method of decoding an audio signal, including receiving an audio signal including a spatial information signal and a downmix signal, obtaining position information of a timeslot using a timeslot number and a parameter number included in the audio signal, generating a multi-channel audio signal by applying the spatial information signal to the downmix signal according to the position information of the timeslot, and arranging multi-channel audio signal correspondingly to an output channel.

The position information of the timeslot may be represented as a variable bit number. And the position information may include an initial value and a difference value, wherein the initial value indicates the position information of the timeslot to which a first parameter is applied and wherein the difference value indicates the position information of the timeslot to which a second or subsequent parameter is applied. And the initial value may be represented as a variable bit number decided using at least one of the timeslot number and the parameter number. And the difference value may be represented as a variable bit number decided using at least one of the timeslot number, the parameter number and the position information of the timeslot to which a previous parameter is applied. And the method may further include arranging downmix signal for the downmix signal according to a preset method. And arranging the downmix signal may be performed on the downmix signal entering a signal converting unit upmixing two downmix signals into three signals. And if a header is included in the spatial information signal, the downmix signal arrangement may be to arrange the downmix signal using audio signal arrangement information included in configuration information extracted from the header. And information quantity required for mapping an ith audio signal or for arranging an ith downmix signal may be an minimum integer equal to or greater than $\log_2$[(the number of total audio signals or the number of total downmix signals)−(a value of the 'i')+1]. And the arranging of the multi-channel audio signal may further include arranging the audio signal correspondingly to a speaker.

According to another aspect of the present invention, there is provided an apparatus for decoding an audio signal, including an upmixing unit upmixing an audio signal into a multi-channel audio signal and a multi-channel arranging unit mapping the multi-channel audio signal to output channels according to a preset arrangement.

According to another aspect of the present invention, there is provided an apparatus for decoding an audio signal, including a core decoding unit decoding an encoded downmix signal, an arranging unit arranging the decoded audio signal according to a preset arrangement, and an upmixing unit upmixing the arranged audio signal into a multi-channel audio signal.

The invention claimed is:

1. A method of decoding an audio signal, comprising:

receiving the audio signal including an audio descriptor, a downmix signal and a spatial information signal, the audio descriptor including basic information of an audio codec, the basic information including at least one of a transmission rate of the received audio signal, a number of channels, a sampling frequency, an identifier indicating a currently used codec, the spatial information signal including channel level difference (CLD) indicating an energy difference between channels, inter-channel coherences (ICC) meaning a correlation between channels for a OTT box, and channel configuration information including a division identifier indicating a signal is connected to the OTT box and a non-division identifier indicating a signal is connected to an output channel;

generating a multi-channel audio signal from the downmix signal using one or more OTT (One-To-Two) boxes and the channel configuration information; and mapping the multi-channel audio signal to a speaker using speaker mapping information, the speaker mapping information being extracted from the spatial information signal, wherein the downmix signal is generated by downmixing a multi-channel audio signal.

2. The method of claim 1, further comprising:

recognizing whether to generate a multi-channel audio signal from a downmix signal using the spatial information signal and the audio descriptor, wherein the generating the multi-channel audio signal generates the multi-channel audio signal upon recognizing that the multi-channel audio signal is generated.

3. The method of claim 1, further comprising:

recognizing whether the audio signal includes a downmix signal and a spatial information signal using the audio descriptor, wherein the generating the multi-channel audio signal generates the multi-channel audio signal upon determining that the audio signal includes the downmix signal and the spatial information signal.

4. The method of claim 1, wherein the generating the multi-channel audio signal is performed using configuration information included in a header when the header is included in the spatial information signal.

5. The method of claim 4, further comprising detecting that an error occurs in the header when the header is different from a previously extracted header.

6. The method of claim 1, wherein the generating the multi-channel audio signal is performed using previously extracted configuration information when a header is not included in the spatial information signal.

7. The method of claim 1, further comprising decoding the downmix signal based on the audio descriptor when the downmix signal does not have a header.

8. An apparatus of decoding an audio signal, comprising:

a receiving unit receiving the audio signal including an audio descriptor, a downmix signal and a spatial information signal, the audio descriptor including basic information of an audio codec, the basic information including at least one of a transmission rate of the received audio signal, a number of channels, a sampling frequency, an identifier indicating a currently used codec, the spatial information signal including channel level difference (CLD) indicating an energy difference between channels, inter-channel coherences (ICC) meaning a correlation between channels for a OTT box, and channel configuration information including a division identifier indicating a signal is connected to the OTT box and a non-division identifier indicating a signal is connected to an output channel;

a multi-channel generating unit generating a multi-channel audio signal from the downmix signal using one or more OTT (One-To-Two) boxes and the channel configuration information; and a speaker mapping unit mapping the multi-channel audio signal to a speaker using speaker mapping information, the speaker mapping information being extracted from the spatial information signal, wherein the downmix signal is generated by downmixing a multi-channel audio signal.

9. The apparatus of claim 8, further comprising:

a de-multiplexing unit recognizing whether to generate a multi-channel audio signal from a downmix signal using the spatial information signal and the audio descriptor, wherein the multi-channel generating unit generates the multi-channel audio signal upon recognizing that the multi-channel audio signal is generated.

10. The apparatus of claim 8, further comprising:

a de-multiplexing unit recognizing whether the audio signal includes a downmix signal and a spatial information signal using the audio descriptor, wherein the multi-channel generating unit generates the multi-channel audio signal upon determining that the audio signal includes the downmix signal and the spatial information signal.

11. The apparatus of claim 8, wherein the multi-channel generating unit generates the multi-channel audio signal using configuration information included in a header when the header is included in the spatial information signal.

12. The apparatus of claim 8, further comprising further comprising a core decoding unit decoding the downmix signal based on the audio descriptor when the downmix signal does not include a header.

* * * * *

UNITED STATES PATENT AND TRADEMARK OFFICE

CERTIFICATE OF CORRECTION

PATENT NO. : 8,577,483 B2
APPLICATION NO. : 12/065267
DATED : November 5, 2013
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1498 days.

Signed and Sealed this
Seventh Day of April, 2015

Michelle K. Lee
*Director of the United States Patent and Trademark Office*